Jan. 7, 1964     M. W. COUTTS     3,117,005
PROCESS FOR THE MANUFACTURE OF BEER AND THE LIKE
Filed Jan. 19, 1961
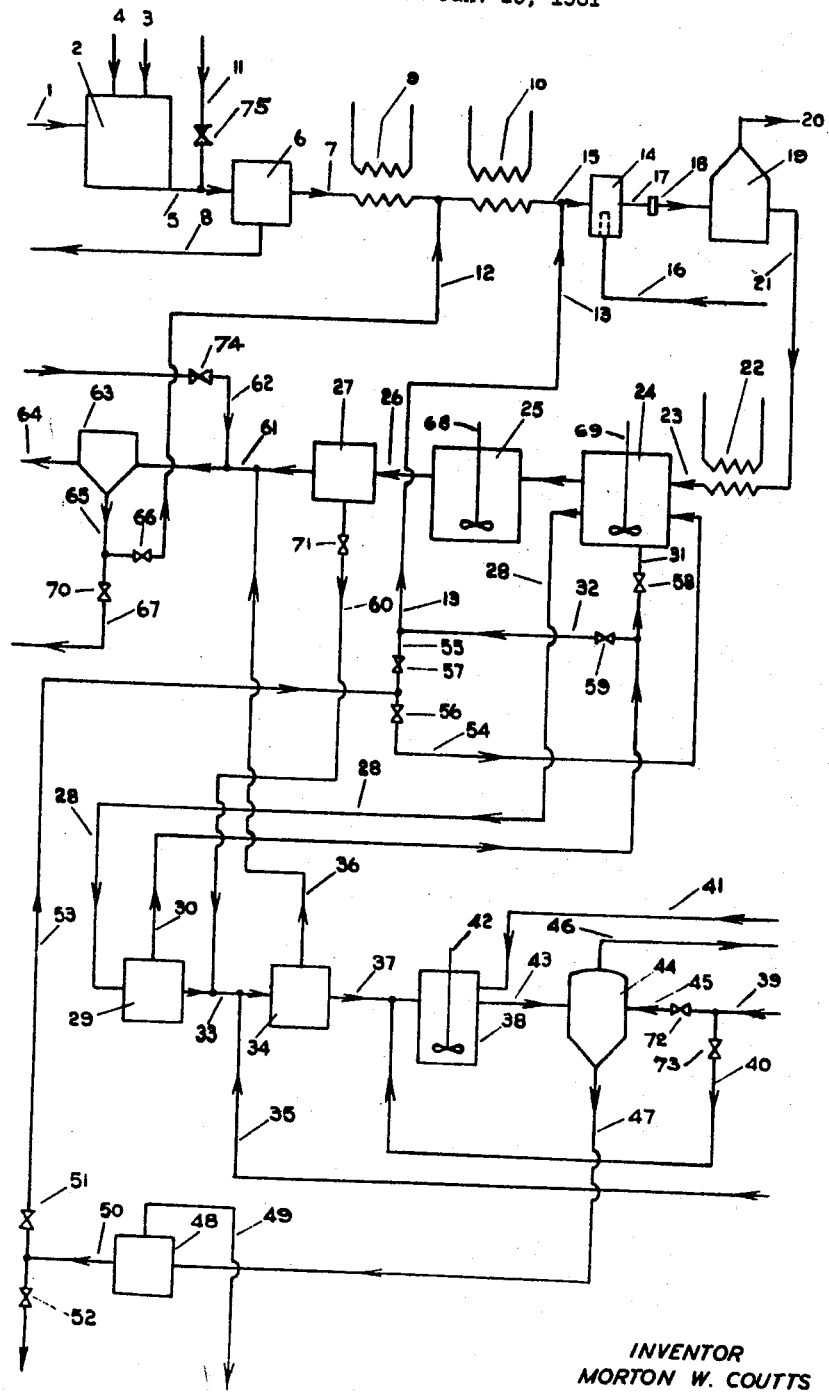
INVENTOR
MORTON W. COUTTS
BY: Featherstonhaugh & Co
ATTORNEYS United States Patent Office 3,117,005
Patented Jan. 7, 1964

3,117,005
PROCESS FOR THE MANUFACTURE OF BEER
AND THE LIKE
Morton William Coutts, 464 Remuera Road,
Remuera, Auckland, New Zealand
Filed Jan. 19, 1961, Ser. No. 83,788
37 Claims. (Cl. 99—52)

This invention relates to a process for the manufacture of beer and the like and has for its objects the provision of an improved continuous process for such manufacture which makes use of certain phenomena which occur during the preparation of brewers' wort and the fermentation thereof and which individually cause problems in production but which when combined bring about beneficial results.

For example, when brewers' wort is boiled certain heat sensitive material precipitates and coagulates. It has been found that these precipitated particles while in a boiling state have adsorptive properties and take up from the wort many objectionable and unwanted flavours. It is normal practice to hold the hot wort before cooling, and during this time these particles coagulate and as they coagulate gradually lose their adsorptive powers, the adsorbed flavours again becoming soluble and so producing objectionable flavours in the finished beer.

Previously when worts were prepared under known methods and the hot wort was held before cooling most of the hot break was removed by sedimentation and the cold break material which precipitates when the wort is cooled to below 80° F. smeared the yeast cell membrane resulting in a reduced rate of fermentation and deterioration in flavour. The wort and the cold wort break which was soon saturated with wort had approximately the same specific gravity and this factor made it difficult to separate this material by methods other than filtration.

It has been found that this new process that when the hot and cold breaks coagulate together, a condition is obtained where this combined hot and cold break material does not interfere with fermentation. During fermentation the specific gravity and viscosity of the wort is lowered and yeast cells become enmeshed with the hot and cold break sediment. These changes increase the difference in specific gravity of the insoluble material and the fermenting wort thereby enabling all of it to be easily separated by centrifugation or sedimentation and removed.

It has also been found that if the boiling wort is rapidly cooled in about 20 seconds to a temperature below 80° F. the hot and cold break will form together in a slurry, this desirable condition being obtained only when the cooling process is carried out in a matter of seconds. It will be appreciated that in batch methods where brews are of large size, it would be impossible to cool the total contents of a vessel in this time. A feature of this improved process is to provide for a continuous wort boiling method so that a continuous flow of boiling wort is cooled directly to a continuous fermenting system.

During fermentation of the wort further material precipitates. It is an object of the present invention to make the fullest use of the adsorptive property of the precipitated hot wort material and at the same time to utilise this precipitated hot wort material to bring about the easier removal of the further material which normally precipitates during fermentation. This is done by causing the said further material to precipitate while the hot and cold break of the wort is coagulating so that they will react with each other and form a compact agglomeration of coagulated material.

The said removal of further material which is usually precipitated towards the end of and after fermentation of wort in normal processes is further facilitated in this improved process by bringing about a sudden reduction in temperature, viscosity and pH of the wort during its cooling. This condition is achieved by returning a continuous flow of fermented wort from a continuous fermenting system and mixing it with a continuous flow of hot or cooling wort. This mixing which is usually in the proportion of one part of fermented wort to each part of wort brings about the sudden reduction of the temperature and the pH value of the wort, thereby causing the precipitation of that material which normally precipitates as a result of fermentation, at the same time that the hot and cold breaks of the wort are forming and it is enmeshed with these materials as they coagulate immediately after cooling.

So it will be seen that the precipitation and coagulation of material from brewers' wort is brought about by reduction in its temperature, and change in its pH value by fermentatation, the faster these changes of temperature and pH the more efficient the precipitation and coagulation of the material.

The fermented wort from the continuous fermenting system may be returned to the wort while it is being cooled from boiling at a point, where, when yeast is present the resulting temperature of the mixture is about 80° F. When returning beer which has been clarified with, for example, either brewers' isinglass or gelatine, sterilisation may be achieved by returning the fermented wort to the hot wort at the inlet of the cooling system or when the last hops are extracted in an enclosed vessel and under pressure a part of the fermented wort may be returned to this vessel, so that final hop extraction and "boiling" are at the lowered pH value. Steps should be taken to prevent the loss of alcohol from the fermented wort during the removal of the hops in the hop separator, until it enters the cooling section of the heat exchanger.

In some cases and especially as herewith described where material in suspension is being removed by centrifugation and water washing, any material contained in the foam remaining on the top of the liquid in the fermenting vessels will not be available for removal. Head formation under these circumstances must be kept to a minimum. Floating material ceases to be a part of the homogeneous mass and can remain on the top of the vessel for long periods. To obviate this problem, all care must be taken to see that the air in contact with the top of the continuous fermenting vessel is at least equal to the temperature of the liquid in the vessel and should be several degrees higher as to destroy in due course the buoyancy of the floating material (mainly of protein nature) by expanding the entrapped $CO_2$ as to rupture its cellular condition, thereby causing it to sink and become part of the homogeneous mass in the fermenting vessel. This can be done by circulating the $CO_2$ from one end of the enclosed vessel passing it through a heater and humidifier of known design and returning it in a heated condition to the top of the fermenting vessel. Steam may be injected directly to the interior of the vessel through jets at a point above the liquid level and by doing so the space above the fermenting liquid and the foam is maintained in a heated condition. From time to time and as found necessary, the temperature of the space above the liquid in any of the continuous fermenting vessels may be raised sufficiently by the injection of steam to sterilise the vessel above the liquid line. It will be found that infection occurring in these vessels can build up on the foam adhering to the sides of the vessel and gradually infect the foam floating on the vessel. As this material can remain in the vessel for a considerable length of time, it becomes an infection pocket continuing to infect the flow of beer through the vessel. Because of the difference in specific gravity of the heated steam, very little heating of the actual fermenting beer takes place and the top of the vessel and its walls can be brought to a temperature of 160° F. which is sufficient for the sterilisation of normal beer infection organisms and at the same time all precipitated material being held in the foam will return to the contents of the vessel and so be available for removal in the centrifugated and water washing system. As an alternative, the foam can be allowed to escape with the $CO_2$ issuing from the vessel. This can be done in an enclosed vessel by arranging for the $CO_2$ take-off pipe to be a few inches above the level of the liquid, and in an open vessel by drawing off the foam and $CO_2$ by vacuum. The $CO_2$ and foam would pass through a foam trap where it will be subjected to heat from a jet of steam. This will cause the foam to collapse to liquid form. This liquid contains a high proportion of hop flavouring material and can be returned to the beer or to the boiling process as desired, the foam-free $CO_2$ then going on to equipment for compression and re-use as desired.

The invention broadly comprises the continuous boiling of wort and the removal therefrom of unwanted material which forms during the continuous boiling, cooling and continuous fermentation of the wort by continuously and rapidly cooling a flow from the boiling wort, passing said flow of cooled wort directly to a continuous fermentation system, and removing the unwanted material from the wort during its fermentation.

The invention is hereunder described with reference to the accompanying diagrammatic drawing which illustrates a form of apparatus suitable for performing the invention. A boiled extract comprising the extract from malt and if required also containing brewers' malt adjuncts is passed in a continuous or intermittent but substantially continuous flow through pipe 1 to hop boiler 2 and when necessary diluting water is added through pipe 3. Hops are added through pipe 4 pro rata to the flow of incoming liquids. The volume of the contents of hop boiler 2 is maintained at a level equal to the volume of the flow into the vessel per hour. The contents of vessel 2 are maintained in a boiling condition and are continually mixed together.

It has been found that approximately 63% of the original contents of vessel 2 are removed when a quantity equal to the contents of the vessel has been added in a continuous flow, mixed with the said contents and an equal quantity of the mixture simultaneously drawn off in a continuous flow. The application of this principle in this improved method provides for a graduated length of time for the continuous boiling of the hop proportions which is normal in batch brewing practice. In batch methods it is sometimes usual to boil two or three types of hops for varying lengths of time. In this continuous boiling method the same conditions can be obtained by using two or three separate hop boiling vessels connected in series (not shown on drawing), the total capacity of the vessels being still equal to the amount flowing through them for about one hour, the hops requiring the longest boiling being added to the first vessel while the delicately flavoured hops usually given a short boil are added to the last vessel. When this is done it is an advantage to employ a second hop strainer placed in the wort flow to the last hop boiling vessel and at the same time still retaining hop strainer 6 in the outlet flow from the last vessel to the wort cooler as shown in the drawing. This arrangement allows the hops in the boiling wort running to the last hop boiling vessel to be separated and discarded so that hop separated wort runs to the last vessel. The delicately flavoured hops added to the last vessel when separated at its outlet are returned to the first hop boiling vessel for further extraction. Under this arrangement a large proportion of the total hops used can be added to the last vessel. The more delicate hop aroma of these hops can be prevented from escaping if the last vessel of the said series connected vessels is maintained with a pressure of up 5 p.s.i.g. above the liquid. The temperature of this last vessel can then be controlled at any desired temperature up to 220° F. without ebullition occurring. Under these conditions the temperature should be thermostatically controlled at a point which gives best hop flavour in the finished beer. To prevent the outflowing wort flashing into steam when the last vessel is operated under pressure and if the temperature is above the boiling point at atmospheric pressure, the outgoing flow of wort would immediately enter a cooling section (not shown) which would bring the temperature of the wort to 212° F. or lower before entering the hop separator 6.

The boiled hopped wort is drawn off from vessel 2 or from the last vessel when a plurality of series connected boiling vessels (not shown) are used and flows at the same rate as the addition to vessel 2, into hop separator 6, the hop free wort from the hop separator continuing to a heat exchanger through pipe 7 and the spent separated hops being carried to waste through pipe 8. The boiling wort is cooled to between 140° and 115° F. in two series-connected heat exchangers 9 and 10. To aid the clarification of the wort carrageen extract or any other known wort finnings may be added through pipe 11 to the hot wort in pipe 5. Clarified fermented wort is added to the flow of cooling wort through pipe 12 and yeasty fermented wort through pipe 13. These additions are described more fully later. No pumps whereby the movement of liquid is caused are shown or mentioned but it will be understod that, where necessary, suitable pumps of known construction are provided. The cooled wort and fermented wort mixture which contains fermenting yeast enters holding vessel 14 through pipe 15 at a temperature of between 105° F. and 60° F. preferably about 75° F. Air is caused to flow through pipe 16 to vessel 14 which together with the fermenting yeast brings about a pressure of $CO_2$ and air with which the cooled wort and precipitated material is saturated. The fermenting mixture continues to flow through pipe 17 and pressure reducing valve 18 on its way to continuous fermentation vessel 19. During the time required for the wort and fermented wort mixture to pass through vessel 14 the various precipitated materials coagulate and become an intimate mixture with the $CO_2$ and air, the degree of saturation being controlled by reducing valve 18 so that on entering vessel 19 coagulated material floats to the surface of the liquid in the vessel. The liquid in vessel 19 is maintained at such a level that all the coagulated material which floats to the surface is forced out with the air and $CO_2$ being vented through pipe 20. In order to recover the fermenting wort contained in the coagulated materials leaving pipe 20 it can be diluted with added water, the fermenting wort and water mixture being separated from the coagulated material and returned to the system as a diluent either at the inlet of the wort cooler 9, vessel 2 or back to vessel 19. Any known means of separating the wort mixture from the material already coagulated before it enters vessel 19 may be used and any sediment collecting at the bottom of vessel 19 may also be removed by known means and similar means may be provided in pipe 21.

It is also a proposed alternative provision of the process to add shredded hops to the hop boiling vessel 2 so that the hops may by-pass the hop separator 6 and so pass through the cooling equipment and be cooled down with the wort, the hopped wort passing directly to the fermenting vessel 19, the hops and coagulated material then being removed from the fermentation vessel 19 as previously described.

The volume of the contents of vessel 19 is maintained at a predetermined level equal to the volume of the flow into the vessel over a period of up to four hours. The fermenting wort in vessel 19 is maintained at any desired temperature between 45 and 100° F. according to the type of yeast being used and the beer being made and is usually about 70° F. The lower temperatures are used for bottom fermentation yeast and high temperatures for top fermentation yeasts. From vessel 19 the outflow of fermenting wort and coagulated material still in suspension continues through pipe 21 to heat exchanger 22 where it is cooled to a suitable temperature so that on passing through pipe 23 to continuous fermentation vessel 24 the contents of vessel 24, despite the heat of fermentation, are maintained at a desired temperature which would be between 45° and 100° F. and preferably 60° F. Alternatively heat exchanger 22 may be eliminated and the temperature of vessel 24 maintained by cooling coils or jacket of known design (not shown). The fermenting mixture passes from vessel 24 to vessel 25 where fermentation continues and the desired degree of fermentation is achieved. Both vessels 24 and 25 are fitted with agitators of known design. The fermenting system used may not necessarily be composed of vessels 19, 24 and 25 as shown on the diagram. Any other of the known systems of continuous fermentation as described in my copending application 53,495 filed September 1, 1960 may be used. The fermenting wort then passes by pipe 26 to yeast separator 27. Fermenting wort from the bottom of vessel 24 is caused to flow through pipe 28 at a rate per hour equal to about one-twentieth of the contents of vessel 24 to yeast separator 29, which can be of any known type, the substantially yeast-free liquid from vessel 29 passing through pipe 30 either being returned to vessel 24 through pipe 31, or through pipe 32 to pipe 13. Alternatively the flow can be diverted through both pipe 31 and 32 according to the density of yeast required in the flow through pipe 13. The substantially fermenting wort free yeast cream together with coagulated material from vessel 24 leaves yeast separator 29 through pipe 33 to a centrifugal separator 34 of known design during which it is mixed with diluting water through pipe 35 and then separated so that substantially all the fermenting wort contained in the coagulated material is carried off and returned to the fermenting system with the diluting water through pipe 36. The fermenting wort free yeast and coagulated material go by way of pipe 37 to yeast washing vessel 38. The back-washing of the mixture of fermenting wort, precipitated material and yeast, by diluting water and returning the diluted wort to the fermenting system prevents the loss of fermenting wort which occurs if the yeast and precipiated material is passed to the washing system directly and from which all washing water is run to waste. Under some conditions is is an advantage to fit a screen of known type but not shown in pipe 28 which will continuously remove large particles of sediment and hop resins before entering separator 29.

Water through pipe 39 and pipe 40 is caused to mix with the flow of yeast cream in pipe 37. The volume of the contents of vessel 38 is equal to the flow into it for one hour. Acid or alkali adjustments together with other known purification materials are added through pipe 41 and, where necessary, there can be a plurality of yeast washing vessels 38 connected in series but not shown so that acid or alkali materials can be added to the series-connected vessels separately. The yeast cream water mixture is caused to pass through vessel 38 where because of the agitator 42 it is intimately mixed with the contents. The resultant mixture then flows through pipe 43 to yeast sedimentation and trub removal vessel 44. Water is caused to flow through pipe 45 to vessel 44 so that the upward velocity of the water causes all trub or precipitated protein material and other coagulated sediment carried over with the yeast from the fermenting vessels together with products of yeast metabolism to leave the vessel 44 together with the waste water through pipe 46. The flow of water from pipe 45 passing through vessel 44 is at such a velocity that the yeast cells are not carried up and out at the top of the vessel but settle to the bottom of the vessel, where they are carried through pipe 47 together with a certain amount of excess water to yeast separator 48. Excess water is separated and run to waste through pipe 49, the clean washed yeast cream leaving the separator through pipe 50.

With the use of some types of brewers' wort and especially those rich in amino acid, it is an advantage to have a plurality of yeast sedimentation vessels 44 (not shown) and operate these vessels alternately as batch vessels so that the washed yeast can be held mixed with chilled water for a resting period of up to 48 hours before being separated from the water and returned to the continuous fermenting system. During this resting period in the yeast washing system, the yeast is denuded of unwanted material which would otherwise be given up to the beer during the fermenting cycle of the yeast in the fermenting vessels 24 and 25, the said denuded material leaving the yeast washing system with the wash water through pipe 46, and runs to waste. In the processing of some beers yeast separator 48 can be omitted and the watery yeast cream from pipe 47 allowed to enter the fermenting system through pipe 50. From pipe 50 the washed yeast cream passes partly through valve 51 to return to the fermenting system and partly through valve 52 to waste disposal. From valve 51 through pipe 53 the yeast cream passes partly through pipe 54 to fermenting vessel 24 and partly through pipe 55 to pipe 13, where it mixes with the substantially yeast free fermenting beer from pipe 32. It will be seen that by adjusting valves 56 and 57 the yeast cream can be diverted either to vessel 24 or to pipe 13 in any proportion and by adjusting valves 58 and 59 the proportion of yeast free fermented wort to vessel 24 and pipe 13 can also be adjusted.

The fermented wort from vessel 25 flowing through pipe 26 is substantially separated from its suspended yeast by passing through yeast separator 27 of known design, the separated yeast cream being removed through pipe 60 and the substantially yeast free beer passing by way of pipe 61, where if desired it meets a flow of brewers' finings made from either isinglass or gelatine flowing through pipe 62. The flow of finings in pipe 62 would be equal to about 1% of the flow of beer through pipe 61. The finings entering fining vessel 63 with the beer through pipe 61 cause a flock to form which settles to the conical bottom. The nearly clear beer flows by way of pipe 64 to holding vessels (not shown) for further processing. The flocked material from the finings and the beer is taken by way of pipe 65 through valve 66 to pipe 12 where it is caused to mix with the sediment in the cooling wort and any excess flock not required is run through pipe 67 where, after separation of the beer contained in it, the flock is run to waste. If desired finings vessel 63 may be by-passed, the beer passing through pipe 61 directly to pipe 64 for further processing. In this case isinglass type finings preferably about ¼% may be added to pipe 12 directly from pipe 62 and of course pipes 65 and 67 will not be used.

Agitators 68 and 69 are of conventional design and maintain the contents of vessels 24 and 25 in a substantially homogeneous mass. Valve 70 is adjusted to control the amount of excess fining flock through pipe 67. Valve 71 controls the flow of yeast cream through pipe 60. Valve 72 controls the quantity of water entering vessel 44 so that the velocity of water rising to the outlet pipe 46 is sufficient to lift the coagulated precipitates but at the same time to allow the washed yeast to settle in the vessel. Valve 73 controls the washing water through pipe 40 to vessel 42. Valve 74 controls the flow of isinglass finings to the flow of beer through pipe 61.

FIG. 1 illustrates a form of apparatus suitable for carrying out the improved process. The equipment used is conventional equipment used in brewing and food processing procedures and is of standard known design. No claims are made for novelty of design for any of the equipment used.

It is known phenomenon that wort finings and beer finings have opposite electrical charges and when the beer finings contained in the flock from vessel 63 or, when vessel 63 is omitted directly from pipe 62, mix with the wort sediment and the wort finings entering pipe 5 through pipe 11 a very fast coagulation of all precipitated material results. By returning fermented wort through pipes 12 and 13 and in some cases to the last hop boiler (not shown) in a total amount of up to 1½ parts of fermented wort to each part of wort, the mixture passing through pipe 15 will be at a pH of approximately 4.4 whereas the wort in the first hop boiler 2 will be at a pH of about 5.2. The sudden drop in the pH value brought about by the wort and fermented wort mixing at this point causes a precipitation of material which normally occurs at the end of fermentation and because the pH drop during fermentation is a slow movement from 5.2 to 4.2, the fermented beer in normal processes requires to be stored for a period of time before this particular pH sensitive material precipitates. In this improved method the sudden change in pH value of the flow to vessel 14 results in this fine precipitation occurring almost immediately and being enmeshed with the coagulated material forming at this point it is easily removed during fermentation.

It will be seen that by adjusting valve 57 controlling the amount of thick yeast cream, and valve 59 controlling the flow of substantially yeast free fermented wort, any degree of yeast and fermented wort mixture may be obtained and added to the flow in pipe 15. The amount of air entering through pipe 16 is adjusted for the purpose of aiding the propagation of the yeast contained in vessels 14 and 19 and also helps the upward movement of the mixture of coagulated material from the boiled wort so that it is ejected from pipe 20.

It will be seen that the system provides for treatment equipment which eliminates the protein and other precipitated material not eliminated in vessel 19 as well as excreted material from the yeast cells while contained in vessels 38 and 44. The treatment equipment also provides for a resting period for the fermenting yeast and all this is substantially controlled by the temperature of the water used to carry out the unwanted material washing process and by the adjustment of the pH of the water used and the size of the yeast washing vessel 38 in relation to the flow through it, or where used, in the plurality of yeast washing vessels as described but not shown.

The continuous hop boiling vessel 2 is fed by a continuous or semi-continuous flow of boiled malt extract and adjuncts as normally contained in brewers' unhopped boiled wort and which up to this point, is processed in the normal manner as practised in present batch brewhouse methods. This extract would be prepared in batches but the number would be so regulated that a continuous flow of these batches is made to the continuous hop boiling vessel, i.e., if a 1000 gallon per hour continuous flow was required, then 3000 gallons of extract would be prepared in batches every three hours.

To enable the brewhouse to be closed down during the week-ends, sufficient of this boiled extract could be prepared during the work week and condensed to a specific gravity of about 1300° so that a continuous flow of such condensed extract could during the week-end be fed to the continuous hop boiling vessel 2 together with the necessary water for diluting it to the specific gravity required for hop boiling.

This boiling specific gravity would normally be from say 1,060 to 1,085 S.G. to allow for the dilution in the fermentation system but could be varied for special brews.

It is alternatively provided that the condensed extract be obtained direct from a malt-house in a form which after dilution was suitable for its continuous addition to the continuous hop boiling vessel 2 or vessels not shown either during the week-ends only or in a continuous flow and so obviate the usual brewhouse necessary for preparing the malt extract.

What I claim as my invention is:

1. In a continuous wort boiling and fermentation process, a method of treating brewers' wort comprising the steps of adding fermenting brewers' wort to unfermented brewers' wort while the latter is being cooled from a temperature about equal to its boiling point so that the temperature of the mixture is below 105° F.

2. A method as claimed in claim 1, wherein the boiling wort is rapidly cooled so that the mixture is between about 80° F. and 40° F.

3. A method as claimed in claim 1, wherein the unfermented cooling wort and the fermenting wort are each fed as a substantially continuous stream.

4. A method as claimed in claim 1, wherein cooling is effected in about twenty seconds.

5. A method as claimed in claim 1, wherein the pH of the unfermented brewers' wort is reduced to below pH 4.6 during such cooling by the addition of the said fermenting brewers' wort.

6. A method as claimed in claim 1, wherein further cooling is effected by adding fermented beer to the unfermented brewers' wort, which fermented beer at a temperature below 70° F. also has the effect of reducing the pH of the unfermented cooling wort.

7. A method as claimed in claim 1, wherein the wort being treated is supplied substantially continuously from hop wort boiling means.

8. A method as claimed in claim 7, wherein a plurality of series connected hop wort boiling vessels are provided each receiving a supply of hops, and the hops are separated from the effluent passing from the last vessel of the series and passed to waste.

9. A method as claimed in claim 8 wherein a hop strainer is provided at the inlet of the last of the said series connected vessels, the separated hops from said hop strainer passing to waste, and the hops separated from the effluent from said last vessel being returned to the first of said series connected vessels.

10. A method as claimed in claim 8, wherein the last of said series connected vessels is operated under pressure, and fermented wort is returned to said pressure operated vessel.

11. A method as claimed in claim 7, wherein hops are substantially continuously added to the hop wort boiling means.

12. A method as claimed in claim 7, wherein the hops in said wort are caused to flow with the wort, being later separated during fermentation of the wort.

13. A method as claimed in claim 1, wherein the wort treated contains wort finings.

14. A method as claimed in claim 1, wherein beer finings are added to the wort during cooling treatment with resultant coagulation of the precipitated materials.

15. A method as claimed in claim 6, wherein beer finings are added to the wort during cooling treatment with resultant coagulation of the precipitated materials, and wherein the beer finings are carried in a proportion of fermented beer having a pH of about 4.2, the unfermented brewers' wort to which the beer finings is added having a pH of about 5.2.

16. A method as claimed in claim 1, wherein the treated wort is passed to a pressure vessel where air is added while the wort is maintained under pressure.

17. A method as claimed in claim 16, wherein the wort is passed to a flotation vessel where precipitated protein and other precipitated material present coagulates, mixes with the air added and floats to the surface of the wort in the vessel for collection and further treatment.

18. A process as claimed in claim 16, wherein wort is substantially continuously fed into said pressure vessel and wherein fermented beer is also fed into said pressure vessel.

19. A process as claimed in claim 18, wherein said fermented beer contains yeast in suspension.

20. A process as claimed in claim 1, wherein the treated wort is passed to a continuous fermentation system and wherein yeast together with precipitated wort material substantially free of fermenting wort is separated out from the fermenting wort during fermentation thereof and is washed by treating it with water, and wherein during washing an upward flow of water is maintained in a yeast sedimentation vessel, the velocity of flow being sufficient to carry the precipitated material and other coagulated sediment upwardly for disposal while allowing yeast cells to settle therein for collection and reuse.

21. A process as claimed in claim 20, wherein said yeast cells substantially free of fermenting wort are separated out and further treated with water.

22. A process as claimed in claim 21, wherein said water is acidulated.

23. A process as claimed in claim 20, wherein said yeast cells are allowed to remain in a vessel containing chilled water for a period of time up to 48 hours to allow the yeast cells to rest before reuse.

24. In a continuous wort boiling and fermentation process for the manufacture of fermented malt beverages, a method for the removal of precipitated material which forms during the continuous boiling, cooling and continuous fermentation of brewers' wort, said method comprising the steps of continuously and rapidly cooling the boiling wort passing said cooled wort directly to a continuous fermentation system reducing the pH of the wort during said rapid cooling by continually returning a portion of fermenting wort from said fermentation system to said brewers' wort during said cooling so that the mixture is below 80° F. and removing precipitated material from the wort during its fermentation.

25. A method as claimed in claim 24, wherein the said returned fermenting wort is substantially free of active yeast and is mixed with the boiling wort at the inlet to the cooling system.

26. A method as claimed in claim 24, wherein the returned fermenting wort contains yeast and a shock-cooling of the unfermented cooling wort is achieved by mixing the returned fermenting wort with it, which returned fermenting wort is colder than the unfermented wort being cooled.

27. A method as claimed in claim 24, wherein returned fermented beer free of active yeast is mixed with the cooling wort during its cooling stage.

28. A method as claimed in claim 24, wherein fermenting wort containing active yeast is returned to the cooling wort at a point in the cooling system, the relative temperatures being adjusted so that the resulting mixture is at a temperature below approximately 105° F.

29. A method as claimed in claim 24, wherein the boiling wort contains wort finings and the returned fermented wort free of active yeast contains beer finings, so that the wort fining flock and the beer fining flock resulting therefrom will react with each other on mixing.

30. A method as claimed in claim 24, wherein suspended precipitated material is removed from the fermenting wort by passing it through a centrifugal separator, which separates the suspended material together with yeast, and wherein the yeast is separated from the precipitated materials by water flotation, a portion of the separated yeast being returned to the fermenting system.

31. A method as claimed in claim 30, wherein during said flotation an upward flow of water is maintained of sufficient velocity to carry precipitated protein material and other coagulated material upwardly for disposal while allowing yeast cells to settle therein for collection and reuse.

32. A method as claimed in claim 24, wherein excretable material from the yeast cells is removed by separating thet yeast from the fermenting wort, washing the yeast of adhering material with water and resting the yeast suspended in water for a period of time up to 48 hours then separating the yeast from the washing water and returning a portion of the yeast to the fermenting system.

33. A method as claimed in claim 24, wherein said precipitated material removed is washed of adhering fermenting wort with diluting water and the resultant water diluted fermenting wort is returned to the fermenting system.

34. A method as claim in claim 17, wherein adhering wort on collected material precipitated from the wort is washed with diluting water and the resultant water diluted wort is returned to the said flotation vessel.

35. A method as claimed in claim 8 wherein at least one of said hop wort boilers is operated under pressure to prevent ebullition therein.

36. A method as claimed in claim 35 wherein the effluent from the last hop wort boiler is cooled under pressure to below boiling point at atmospheric pressure.

37. A process as claimed in claim 21 wherein said water is alkaline.

References Cited in the file of this patent

UNITED STATES PATENTS

| | | |
|---|---|---|
| 1,891,841 | Sak | Dec. 20, 1932 |
| 2,034,468 | Heuser | Mar. 17, 1936 |
| 2,380,434 | Heinle | July 31, 1945 |
| 2,398,189 | Monroe | Apr. 9, 1946 |
| 2,657,174 | Stich | Oct. 27, 1953 |
| 2,789,907 | Haselbach | Apr. 23, 1957 |